(12) United States Patent
Chen et al.

(10) Patent No.: US 12,354,761 B2
(45) Date of Patent: Jul. 8, 2025

(54) PEROVSKITE BETAVOLTAIC-PHOTOVOLTAIC BATTERY

(71) Applicant: CONTEMPORARY AMPEREX TECHNOLOGY (HONG KONG) LIMITED, Hong Kong (CN)

(72) Inventors: Changsong Chen, Ningde (CN); Weifeng Liang, Ningde (CN); Ling Xiang, Ningde (CN); Bao Tu, Ningde (CN); Yongsheng Guo, Ningde (CN); Guodong Chen, Ningde (CN); Chuying Ouyang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 225 days.

(21) Appl. No.: 18/447,310

(22) Filed: Aug. 10, 2023

(65) Prior Publication Data
US 2023/0402201 A1    Dec. 14, 2023

Related U.S. Application Data

(63) Continuation of application No. PCT/CN2021/143764, filed on Dec. 31, 2021.

(51) Int. Cl.
*G21H 1/06* (2006.01)

(52) U.S. Cl.
CPC .................. *G21H 1/06* (2013.01)

(58) Field of Classification Search
CPC ........... G21H 1/06; G21H 1/12; Y02E 10/549
See application file for complete search history.

(56) References Cited

U.S. PATENT DOCUMENTS

2016/0268510 A1* 9/2016 Moon .................. C07F 13/00
2016/0293872 A1* 10/2016 Ko ...................... H10K 30/151
(Continued)

FOREIGN PATENT DOCUMENTS

| CN | 103996733 A | 8/2014 |
|---|---|---|
| CN | 103996734 A | 8/2014 |

(Continued)

OTHER PUBLICATIONS

International Search Report received in the corresponding International Application PCT/CN2021/143764, mailed Dec. 31, 2021.
(Continued)

*Primary Examiner* — Ahmed Elnakib
(74) *Attorney, Agent, or Firm* — K&L Gates LLP (57) ABSTRACT

Provided are a perovskite betavoltaic-photovoltaic battery. The battery includes a first electrode, a first charge transport layer, a perovskite layer, a second charge transport layer, and a second electrode in sequence. The first electrode is a transparent electrode. The first charge transport layer is an electron transport layer and the second charge transport layer is a hole transport layer, or, the first charge transport layer is a hole transport layer and the second charge transport layer is an electron transport layer. The perovskite layer is doped with a fluorescent substance. At least one of the first electrode, the first charge transport layer, the second charge transport layer, or the second electrode is radioactive. When the first electrode and/or the second electrode is radioactive, the first electrode and/or the second electrode is an irradiated electrode formed by compounding a radioactive source and a conductor material.

13 Claims, 1 Drawing Sheet

(56) References Cited

U.S. PATENT DOCUMENTS

| | | | |
|---|---|---|---|
| 2019/0058135 A1* | 2/2019 | Ma | H10K 30/10 |
| 2019/0221742 A1* | 7/2019 | Li | H10K 71/18 |
| 2020/0136073 A1* | 4/2020 | Kim | H10K 30/10 |
| 2020/0373498 A1* | 11/2020 | Park | H10K 85/50 |
| 2023/0207149 A1* | 6/2023 | Cao | H10K 59/60 |
| | | | 136/243 |
| 2023/0307152 A1* | 9/2023 | Chen | G21H 1/04 |
| 2023/0371290 A1* | 11/2023 | Chen | H10K 85/50 |
| 2023/0402201 A1* | 12/2023 | Chen | G21H 1/12 |

FOREIGN PATENT DOCUMENTS

| | | |
|---|---|---|
| CN | 105047825 A | 11/2015 |
| CN | 107093486 A | 8/2017 |
| CN | 111261311 A | 6/2020 |
| CN | 111477750 A | 7/2020 |
| WO | 2020232507 A1 | 11/2020 |
| WO | 2021252601 A1 | 12/2021 |

OTHER PUBLICATIONS

Written Opinion received in the corresponding International Application PCT/CN2021/143764, mailed Dec. 31, 2021.

* cited by examiner

PEROVSKITE BETAVOLTAIC-PHOTOVOLTAIC BATTERY

TECHNICAL FIELD

This application relates to a perovskite betavoltaic-photovoltaic battery and a manufacturing method thereof.

BACKGROUND

A photovoltaic cell is an optical-to-electrical conversion device that converts optical energy into electrical energy, and is highly efficient in energy conversion. Clean and pollution-free solar energy can be effectively utilized through the photovoltaic cells. However, the photovoltaic cells depend on weather and seasons to a great extent.

A nuclear battery, also known as an isotope battery, is a device that converts the energy, which is released by radioisotopes during decay, into electrical energy. Nuclear batteries have the merits such as a long life, high environmental stability, and miniaturization ability, but are inefficient in energy conversion. The nuclear batteries convert energy in various ways. A nuclear battery that forms a power output through a P-N junction or a P-I-N junction after converting the energy of high-energy particles of a radioactive source into photocarriers by using a photoelectric effect is referred to as a betavoltaic nuclear battery (hereinafter referred to as "betavoltaic battery"). The working principles of the betavoltaic battery are similar to those of a photovoltaic cell.

If the betavoltaic battery and the photovoltaic cell can coordinate with each other to exert their respective merits, a betavoltaic-photovoltaic battery that is of excellent environmental stability and high efficiency of energy conversion can be implemented.

SUMMARY

This application is put forward in view of the above problems, and an objective of this application is to provide a perovskite betavoltaic-photovoltaic battery that can convert isotope decay particles or other energy particles and solar energy into electrical energy simultaneously, so as to reduce the dependence on lighting conditions and improve environmental stability and energy conversion efficiency.

A first aspect of this application provides a perovskite betavoltaic-photovoltaic battery. The battery includes a first electrode, a first charge transport layer, a perovskite layer, a second charge transport layer, and a second electrode in sequence. The first electrode is a transparent electrode. The first charge transport layer is an electron transport layer and the second charge transport layer is a hole transport layer, or, the first charge transport layer is a hole transport layer and the second charge transport layer is an electron transport layer. The perovskite layer is doped with a fluorescent substance. At least one of the first electrode, the first charge transport layer, the second charge transport layer, or the second electrode is radioactive. When the first electrode and/or the second electrode is radioactive, the first electrode and/or the second electrode is an irradiated electrode formed by compounding a radioactive source and a conductor material. When the first charge transport layer and/or the second charge transport layer is radioactive, the first charge transport layer and/or the second charge transport layer is an irradiated semiconductor formed by compounding a radioactive source and a semiconductor material.

In some embodiments, a mass percent of the fluorescent substance contained in the perovskite layer is 1 wt % to 30 wt %, and optionally 10 wt % to 15 wt %, of a total mass of the perovskite layer.

In some embodiments, the fluorescent substance in the perovskite layer is at least one selected from riboflavin, fluorescein isothiocyanate, tetraethyl rhodamine, tetramethyl isothiocyanate rhodamine, phycoerythrin, an iridium complex, a rare earth element complex, a polyfluorene compound, a coumarin compound, a naphthalimide compound, a triacene compound or a higher-acene compound, a rhodamine compound, a fluorescein compound, a fluoroborodipyrrole compound, a resorufin compound, a pyrazoline compound, a triphenylamine compound, a carbazole compound, green fluorescent protein, a bimane fluorescent compound, a perovskite luminescent nanomaterial, a thermally activated delayed fluorescence (TADF) compound, a chelate of trivalent rare earth lanthanides, and any derivative or copolymer thereof, and is optionally tetraethylrhodamine or a chelate of trivalent rare earth lanthanides, where the chelate of trivalent rare earth lanthanides is optionally $LaF_3:Eu^{3+}$.

In some embodiments, perovskite in the perovskite layer satisfies a chemical formula $ABX_3$, where A is at least one selected from methylamine cation $MA^+$, formamidinium cation $FA^+$, and cesium cation $Cs^+$; B is at least one selected from lead cation $Pb^{2+}$ and tin cation $Sn^{2+}$; and X is a halogen ion, $COO^-$, or a mixed-anion thereof.

In some embodiments, the radioactive source is at least one selected from an α-type radioactive source, a β-type radioactive source, an X-ray radioactive source, and a γ-ray radioactive source.

In some embodiments, the α-type radioactive source is at least one selected from $^{210}Po$ or a compound thereof, $^{228}Th$ or a compound thereof, $^{235}U$ or a compound thereof, $^{238}Pu$ or a compound thereof, $^{238}PuO_2$ microspheres, $^{241}Am$ or a compound thereof, $^{242}Cm$ or a compound thereof, and $^{244}Cm$ or a compound thereof; and the β-type radioactive source is at least one selected from $(C_4H_3{}^3H_{5-})_n$, $^3H_2$, $Ti^3H_4$, $^{14}C$ or a compound thereof, $^{35}S$ or a compound thereof, $^{63}Ni$ or a compound thereof, $^{90}Sr$ or a compound thereof, $^{90}Sr/^{90}Y$ $^{99}Tc$ or a compound thereof, $^{106}Ru$ or a compound thereof, $^{137}Cs$ or a compound thereof, $^{144}Ce$ or a compound thereof, $^{147}Pm$ or a compound thereof, $^{151}Sm$ or a compound thereof, and $^{226}Ra$ or a compound thereof.

In some embodiments, the radioactive source is optionally a β-type radioactive source, and further optionally, is at least one selected from $Ti^3H_4$, $^{63}Ni$, and $^{90}s/^{90}Y$.

In some embodiments, a mass percent of the radioactive source in the irradiated electrode and/or the irradiated semiconductor is 90 wt % or less, and optionally 5 wt % to 30 wt %.

In some embodiments, the semiconductor material of the first charge transport layer and the second charge transport layer is at least one of the following materials or a derivative thereof: an imide compound; a quinone compound; fullerene or a derivative thereof, 2,2',7,7'-tetrakis(N,N-p-methoxyanilino)-9,9'-spirobifluorene; methoxytriphenylamine-fluoroformamidine; poly(3,4-ethylenedioxythiophene): polystyrene sulfonic acid; poly-3-hexylthiophene; triptycene-cored triphenylamine; 3,4-ethylenedioxythiophene-methoxytriphenylamine; N-(4-aniline)carbazole-spirobifluorene; polythiophene; metal oxide of a metal element selected from Mg, Ni, Cd, Zn, In, Pb, Mo, W, Sb, Bi, Cu, Hg, Ti, Ag, Mn, Fe, V, Sn, Zr, Sr, Ga, and Cr; silicon oxide; strontium titanium oxide; calcium titanium oxide; lithium fluoride; calcium fluoride; and cuprous thiocyanate.

In some embodiments, the conductor material of the first electrode and the second electrode is an organic conductive material, an inorganic conductive material, or a conductive material compounded of an organic conductive material and an inorganic conductive material. The organic conductive material is at least one selected from: a polymer of (3,4-ethylenedioxythiophene monomer); polythiophene; polyacetylene; polypyrrole; polyphenylene; polyphenylacetylene; polyaniline; epoxy resin; phenol-formaldehyde resin, and polypropylene. The inorganic conductive material is at least one selected from a transparent conductive oxide, a metal, and a carbon derivative.

In some embodiments, a thickness of the first electrode is 50 nm to 1000 nm; and/or a thickness of the first charge transport layer is 10 nm to 1000 nm; and/or a thickness of the perovskite layer is 50 nm to 2000 nm; and/or a thickness of the second charge transport layer is 10 nm to 1000 nm; and/or a thickness of the second electrode is 10 nm to 500 nm.

A second aspect of this application provides a method for manufacturing a perovskite betavoltaic-photovoltaic battery, where the perovskite betavoltaic-photovoltaic battery includes a first electrode, a first charge transport layer, a perovskite layer, a second charge transport layer, and a second electrode in sequence. The manufacturing method includes: a step of forming the first charge transport layer on the first electrode; a step of forming the perovskite layer on the first charge transport layer; a step of forming the second charge transport layer on the perovskite layer; and a step of forming the second electrode on the second charge transport layer. The first electrode is a transparent electrode. The first charge transport layer is an electron transport layer and the second charge transport layer is a hole transport layer, or, the first charge transport layer is a hole transport layer and the second charge transport layer is an electron transport layer. The perovskite layer is doped with a fluorescent substance. At least one of the first electrode, the first charge transport layer, the second charge transport layer, or the second electrode is radioactive. When the first electrode and/or the second electrode is radioactive, the first electrode and/or the second electrode is an irradiated electrode formed by compounding a radioactive source and a conductor material. When the first charge transport layer and/or the second charge transport layer is radioactive, the first charge transport layer and/or the second charge transport layer is an irradiated semiconductor formed by compounding a radioactive source and a semiconductor material. When the first electrode and/or the second electrode is an irradiated electrode, the irradiated electrode is compounded of the radioactive source and the conductor material by at least one method selected from: a chemical bath deposition method, an electrochemical deposition method, a chemical vapor deposition method, a physical epitaxial growth method, a thermal co-evaporation method, an atomic layer deposition method, a magnetron sputtering method, a precursor solution spin-coating method, a precursor solution slot-die coating method, a precursor solution scrape coating method, and a mechanical pressing method. When the first charge transport layer and/or the second charge transport layer is an irradiated semiconductor, the irradiated semiconductor is compounded of the radioactive source and the semiconductor material by at least one method selected from: a chemical bath deposition method, an electrochemical deposition method, a chemical vapor deposition method, a physical epitaxial growth method, a thermal co-evaporation method, an atomic layer deposition method, a magnetron sputtering method, a precursor solution spin-coating method, a precursor solution slot-die coating method, a precursor solution scrape coating method, and a mechanical pressing method.

In some embodiments, the irradiated electrode or the irradiated semiconductor is compounded by at least one of the thermal co-evaporation method, the magnetron sputtering method, or the precursor solution spin-coating method.

This application brings at least the following beneficial effects:

According to this application, a perovskite betavoltaic-photovoltaic battery is provided, in which a perovskite layer is doped with a fluorescent substance. At least one of the first electrode, the first charge transport layer, the second charge transport layer, and the second electrode is radioactive. Therefore, the perovskite betavoltaic-photovoltaic battery according to this application can convert the isotope decay particles or other energy particles and solar energy into electrical energy simultaneously, and can improve the energy conversion efficiency.

DETAILED DESCRIPTION OF EMBODIMENTS

The following describes and discloses in detail a perovskite betavoltaic-photovoltaic battery and a manufacturing method thereof according to this application with due reference to drawings. However, unnecessary details may be omitted in some cases. For example, a detailed description of a well-known matter or repeated description of an essentially identical structure may be omitted. That is intended to prevent the following descriptions from becoming unnecessarily lengthy, and to facilitate understanding by a person skilled in the art. In addition, the drawings and the following descriptions are intended for a person skilled in the art to thoroughly understand this application, but not intended to limit the subject-matter set forth in the claims.

A "range" disclosed herein is defined in the form of a lower limit and an upper limit. A given range is defined by a lower limit and an upper limit selected. The selected lower and upper limits define the boundaries of a particular range. A range so defined may be inclusive or exclusive of the end values, and a lower limit of one range may be arbitrarily combined with an upper limit of another range to form a range. For example, if a given parameter falls within a range of 60 to 120 and a range of 80 to 110, it is expectable that the parameter may fall within a range of 60 to 110 and a range of 80 to 120 as well. In addition, if lower-limit values 1 and 2 are set out, and if upper-limit values 3, 4, and 5 are set out, the following ranges are all expectable: 1 to 3, 1 to 4, 1 to 5, 2 to 3, 2 to 4, and 2 to 5. Unless otherwise specified herein, a numerical range "a to b" is a brief representation of a combination of any real numbers between a and b inclusive, where both a and b are real numbers. For example, a numerical range "0 to 5" herein means all real numbers recited between 0 and 5 inclusive, and the expression "0 to 5" is just a brief representation of a combination of such numbers. In addition, a statement that a parameter is an integer greater than or equal to 2 is equivalent to a disclosure that the parameter is an integer such as 2, 3, 4, 5, 6, 7, 8, 9, 10, 11, 12, and so on.

Unless otherwise expressly specified herein, any embodiments and optional embodiments hereof may be combined with each other to form a new technical solution.

Unless otherwise expressly specified herein, any technical features and optional technical features hereof may be combined with each other to form a new technical solution.

Unless otherwise expressly specified herein, all steps described herein may be performed in sequence or at random, and preferably in sequence. For example, that the method includes steps (a) and (b) indicates that the method may include steps (a) and (b) performed in sequence, or steps (b) and (a) performed in sequence. For example, that the method may further include step (c) indicates that step (c) may be added into the method in any order. For example, the method may include steps (a), (b), and (c), or may include steps (a), (c), and (b), or may include steps (c), (a), and (b), and so on.

Unless otherwise expressly specified herein, "include" and "comprise" mentioned herein mean open-ended inclusion, or closed-ended inclusion. For example, the terms "include" and "comprise" may mean inclusion of other items that are not recited, or inclusion of only the items recited.

Unless otherwise expressly specified herein, the term "or" is inclusive. For example, the expression "A or B" means "A alone, B alone, or both A and B". More specifically, any one of the following conditions satisfies the condition "A or B": A is true (or existent) and B is false (or absent); A is false (or absent) and B is true (or existent); and, both A and B are true (or existent).

In the description of the embodiments of this specification, the technical terms "first" and "second" are merely intended to distinguish between different items but not intended to indicate or imply relative importance or implicitly specify the number of the indicated technical features, specific order, or order of precedence.

Figure 1:
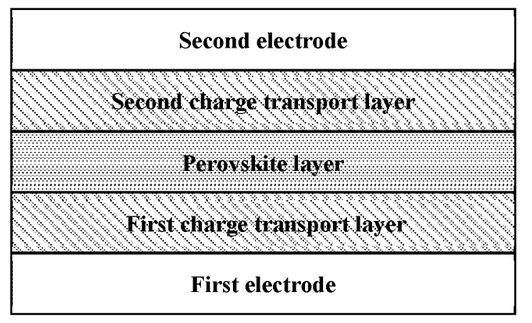
FIG. 1 is a schematic diagram of a structure of a perovskite betavoltaic-photovoltaic battery according to this application.

According to an embodiment of this application, a perovskite betavoltaic-photovoltaic battery is disclosed. As shown in FIG. 1, the perovskite betavoltaic-photovoltaic battery includes a first electrode, a first charge transport layer, a perovskite layer, a second charge transport layer, and a second electrode in sequence.

The first electrode is a transparent electrode. Sunlight can be incident from the first electrode. The perovskite betavoltaic-photovoltaic battery according to this application can perform optical-to-electrical conversion by using the sunlight incident from the first electrode.

The first charge transport layer is an electron transport layer and the second charge transport layer is a hole transport layer, or, the first charge transport layer is a hole transport layer and the second charge transport layer is an electron transport layer. The first charge transport layer, the perovskite layer, and the second charge transport layer together form a P-I-N structured battery function layer.

At least one of the first electrode, the first charge transport layer, the second charge transport layer, or the second electrode is radioactive. When the first electrode and/or the second electrode is radioactive, the first electrode and/or the second electrode is an irradiated electrode formed by compounding a radioactive source and a conductor material; and, when the first charge transport layer and/or the second charge transport layer is radioactive, the first charge transport layer and/or the second charge transport layer is an irradiated semiconductor formed by compounding a radioactive source and a semiconductor material. By causing at least one of the first electrode, the first charge transport layer, the second charge transport layer, or the second electrode to be radioactive, the high-energy particles generated from the radioactive source can be absorbed by the perovskite layer, and converted into energy in the P-I-N structured battery function layer.

The radioactive source may be at least one selected from an α-type radioactive source, β-type radioactive source, an X-ray radioactive source, and a γ-ray radioactive source.

More specifically, the α-type radioactive source may be at least one selected from $^{210}$Po or a compound thereof, $^{228}$Th or a compound thereof, $^{235}$U or a compound thereof, $^{238}$Pu or a compound thereof, $^{238}$PuO$_2$ microspheres, $^{241}$Am or a compound thereof, $^{242}$Cm or a compound thereof, and $^{244}$Cm or a compound thereof. The 1-type radioactive source may be at least one selected from $(C_4H_3{}^3H_5{}_-)n$, $^3H_2$, $Ti^3H_4$, $^{14}$C or a compound thereof, $^{35}$S or a compound thereof, $^{63}$Ni or a compound thereof, $^{90}$Sr or a compound thereof, $^{90}$Sr/$^{90}$Y, $^{99}$Tc or a compound thereof, $^{106}$Ru or a compound thereof, $^{137}$Cs or a compound thereof, $^{144}$Ce or a compound thereof, $^{147}$Pm or a compound thereof, $^{151}$Sm or a compound thereof, and $^{226}$Ra or a compound thereof.

The radioactive source is optionally a β-type radioactive source, and further optionally, is at least one selected from $Ti^3H_4$, $^{63}$Ni or a compound thereof, and $^{90}$Sr/$^{90}$Y.

The radiation particles of the 1-type radioactive source are of relatively low energy and high safety, and exert just a small radiation effect on the perovskite and other battery structures. When at least one of $Ti^3H_4$, $^{63}$Ni or a compound thereof, or $^{90}$Sr/$^{90}$Y is selected as the radioactive source, the preparation process is of high compatibility and high controllability.

With respect to the mass percent of the radioactive source, the mass percent of the radioactive source in the irradiated electrode and/or the irradiated semiconductor is 90 wt % or less, and optionally 5 wt % to 30 wt %.

The perovskite layer of the perovskite betavoltaic-photovoltaic battery according to this application is doped with a fluorescent substance. The fluorescent substance can emit light as irradiated by sunlight and the radiated particles from the radioactive source.

The energy of a short wavelength band in a visible light band of the solar spectrum is relatively high. The excess energy that excites carriers in the perovskite layer results in thermal relaxation, thereby being adverse to battery devices. By doping the perovskite layer with a fluorescent substance, the fluorescent substance can absorb the excess energy, emit long-wave visible light, and make the light reabsorbed by the perovskite, thereby not only reducing heat emission of the battery, but also further improving the utilization efficiency of the solar spectrum.

The fluorescent substance in the perovskite layer is not particularly limited as long as the substance is capable of photoluminescence and/or radioluminescence. Specifically, examples of the fluorescent substance include at least one of riboflavin, fluorescein isothiocyanate, tetraethyl rhodamine, tetramethyl isothiocyanate rhodamine, phycoerythrin, an iridium complex, a rare earth element complex, a polyfluorene compound, a coumarin compound, a naphthalimide compound, a triacene compound or a higher-acene compound, a rhodamine compound, a fluorescein compound, a fluoroborodipyrrole compound (BODIPY), a resorufin compound, a pyrazoline compound, a triphenylamine compound, a carbazole compound, green fluorescent protein, a bimane fluorescent compound (such as monochlorodiamine or monobromodiamine), a perovskite luminescent nanomaterial, a thermally activated delayed fluorescence (TADF) compound (such as triphenylamine-dipyridophenazine (TPA-DPPZ)), a chelate of trivalent rare earth lanthanides, and any derivative or copolymer thereof. The fluorescent substance is optionally tetraethylrhodamine or a chelate of trivalent rare earth lanthanides. The trivalent rare earth lanthanides are, for example, europium ($EU^{3+}$), terbium ($Tb^{3+}$), and cerium ($Ce^{3+}$). The chelate of trivalent rare earth lanthanides is optionally $LaF_3:Eu^{3+}$.

In the perovskite betavoltaic-photovoltaic battery according to this application, a mass percent of the fluorescent substance contained in the perovskite layer is 1 wt % to 30 wt % of a total mass of the perovskite layer, and optionally 10 wt % to 15 wt % of the total mass of the perovskite layer.

Any perovskite substance in the perovskite layer is appropriate for use in the perovskite betavoltaic-photovoltaic battery according to this application as long as the substance satisfies a chemical formula $ABX_3$, where A is at least one selected from methylamine cation $MA^+$, formamidinium cation $FA^+$, and cesium cation $Cs^+$; B is at least one selected from lead cation $Pb^{2+}$ and tin cation $Sn^{2+}$; and X is at least one selected from halogen anion ($F^-$, $Cl^-$, $Br^-$, $I^-$) and $COO^-$. The perovskite serves as an absorber material to absorb sunlight, the radiated particles from the radioactive source, and photons generated by the perovskite layer that contains the fluorescent substance.

The semiconductor material of the charge transport layer of the perovskite betavoltaic-photovoltaic battery according to this application is an n-type semiconductor material or a p-type semiconductor material. The n-type semiconductor material is used in the first charge transport layer and the p-type semiconductor material is used in the second charge transport layer, or, the p-type semiconductor material is used in the first charge transport layer and the n-type semiconductor material is used in the second charge transport layer.

Examples of the semiconductor material include at least one of the following materials or a derivative thereof: an imide compound; a quinone compound; fullerene (C60) or a derivative thereof, poly[bis(4-phenyl)(2,4,6-trimethylphenyl)amine](PTAA), 2,2',7,7'-tetrakis(N,N-p-methoxyanilino)-9,9'-spirobifluorene (Spiro-OMeTAD); methoxytriphenylamine-fluoroformamidine (OMeTPA-FA); poly(3,4-ethylenedioxythiophene): polystyrene sulfonic acid (PE DOT: PSS); poly-3-hexylthiophene (P3HT); triptycene-cored triphenylamine (H101); 3,4-ethylenedioxythiophene-methoxytriphenylamine (EDOT-OMeTPA); N-(4-aniline)carbazole-spirobifluorene (CzPAF-SBF); polythiophene; metal oxide of a metal element selected from Mg, Ni, Cd, Zn, In, Pb, Mo, W, Sb, Bi, Cu, Hg, Ti, Ag, Mn, Fe, V, Sn, Zr, Sr, Ga, and Cr; silicon oxide ($SiO_2$); strontium titanium oxide ($SrTiO_3$); calcium titanium oxide ($CaTiO_3$); lithium fluoride (LiF); calcium fluoride ($CaF_2$); cuprous thiocyanate (CuSCN); and [6,6]-phenyl-C61-isomethyl butyrate (PC60BM) or [6,6]-phenyl-C71-isomethyl butyrate (PC70BM).

The n-type semiconductor material is optionally tin dioxide, titanium dioxide, zinc oxide, C60, or [6,6]-phenyl-C61-isomethyl butyrate. The p-type semiconductor material is optionally 2,2',7,7'-tetrakis(N,N-p-methoxyanilino)-9,9'-spirobifluorene, nickel oxide, poly[bis(4-phenyl)(2,4,6-trimethylphenyl)amine](PTAA), or poly-3-hexylthiophene.

The conductor material of the first electrode and the second electrode of the perovskite betavoltaic-photovoltaic battery according to this application is an organic conductive material, an inorganic conductive material, or a conductive material compounded of an organic conductive material and an inorganic conductive material. The organic conductive material is at least one selected from: a polymer of (3,4-ethylenedioxythiophene monomer); polythiophene; polyacetylene; polypyrrole; polyphenylene; polyphenylacetylene; polyaniline; epoxy resin; phenol-formaldehyde resin, and polypropylene. The inorganic conductive material is at least one selected from a transparent conductive oxide (FTO, ITO, AZO), a metal, and a carbon derivative.

With respect to the thickness of each layer in the perovskite betavoltaic-photovoltaic battery according to this application, for example, the thickness of the first electrode is 50 nm to 1000 nm; the thickness of the first charge transport layer is 10 nm to 1000 nm; the thickness of the perovskite layer is 50 nm to 2000 nm; the thickness of the second charge transport layer is 10 nm to 1000 nm; and, the thickness of the second electrode is 10 nm to 500 nm.

In the perovskite betavoltaic-photovoltaic battery according to this application, a reflective layer may be further disposed at an appropriate position. For example, the reflective layer may be disposed on a side that is of the second electrode and that is opposite to the second charge transport layer. The disposed reflective layer further improves the energy efficiency in the battery.

According to another embodiment of this application, a method for manufacturing a perovskite betavoltaic-photovoltaic battery is disclosed. The method for manufacturing a perovskite betavoltaic-photovoltaic battery according to this application includes: a step of forming the first charge transport layer on the first electrode; a step of forming the perovskite layer on the first charge transport layer; a step of forming the second charge transport layer on the perovskite layer; and a step of forming the second electrode on the second charge transport layer. When the first electrode and/or the second electrode is an irradiated electrode, the irradiated electrode is compounded of the radioactive source and the conductor material by at least one method selected from: a chemical bath deposition method, an electrochemical deposition method, a chemical vapor deposition method, a physical epitaxial growth method, a thermal co-evaporation method, an atomic layer deposition method, a magnetron sputtering method, a precursor solution spin-coating method, a precursor solution slot-die coating method, a precursor solution scrape coating method, and a mechanical pressing method. When the first charge transport layer and/or the second charge transport layer is an irradiated semiconductor, the irradiated semiconductor is compounded of the radioactive source and the semiconductor material by at least one method selected from: a chemical bath deposition method, an electrochemical deposition method, a chemical vapor deposition method, a physical epitaxial growth method, a thermal co-evaporation method, an atomic layer deposition method, a magnetron sputtering method, a precursor solution spin-coating method, a precursor solution slot-die coating method, a precursor solution scrape coating method, and a mechanical pressing method.

Optionally, the irradiated electrode or the irradiated semiconductor is compounded by at least one of a thermal co-evaporation method, a magnetron sputtering method, or a precursor solution spin-coating method.

Optionally, the irradiated electrode is prepared by a magnetron sputtering method or a thermal evaporation method. Optionally, the irradiated inorganic semiconductor is prepared by a thermal co-evaporation method, a magnetron sputtering method, or a precursor solution spin coating method; and the irradiated organic semiconductor layer is prepared by a precursor solution coating method.

EMBODIMENTS

The following describes embodiments of this application. The embodiments described below are illustrative, and are merely intended to construe this application but not to limit this application. Unless other techniques or conditions are expressly specified in an embodiment hereof, the techniques or conditions described in the literature in this field or in an instruction manual of the product may apply. A reagent or instrument used herein without specifying the manufacturer is a conventional product that is commercially available in the market.

Embodiment 1

Magnetron-sputtering a 5 wt %$^{63}$NiCl$_x$-FTO target material of $^{63}$NiCl$_x$ on a white glass substrate of 2.0 cm×2.0 cm in size. The magnetron sputtering is performed by using a reciprocating vacuum coater (Hongda HDW-400-02, hereinafter the same), the sputtering power is 1000 W, the ratio of argon to oxygen is 1:1, the pressure is 0.25 Pa, and the sputter deposition thickness is 550 nm. In this way, a radioactive FTO conductive glass electrode is obtained.

Washing the surface of the obtained radioactive FTO conductive glass twice with acetone and isopropanol separately. Immersing the FTO conductive glass in deionized water, and sonicating the glass for 10 minutes. Drying the glass in a blast air oven, placing the glass into a glovebox (in a N$_2$ atmosphere), and using the glass as a first electrode.

Adding $^{63}$NiCl$_x$ in a SnO$_2$ nanocolloid aqueous solution to obtain a precursor solution, in which the mass percent of SnO$_2$ is 3 wt %, and the mass percent of $^{63}$NiCl$_x$ is 5 wt %. Spin-coating the FTO layer of the first electrode with the precursor solution at a speed of 5000 rpm by using a spin coater (LEBO EZ6-S, hereinafter the same). Subsequently, heating the FTO layer of the first electrode at 150° C. for 15 minutes on a constant-temperature hotplate to obtain a radioactive first charge transport layer that is 30 nm thick, where the first charge transport layer is an electron transport layer.

Spin-coating the obtained first charge transport layer with a tetraethylrhodamine-FAPbI$_3$-DMF solution at a speed of 4500 rpm by using a spin coater, in which the concentration of FAPbI$_3$ is 1.5 mol/L. Subsequently, moving the first charge transport layer onto the constant-temperature hotplate, heating the first charge transport layer at 100° C. for 30 minutes, and then cooling the first charge transport layer down to a room temperature to form a 500-nm thick perovskite layer containing 5 wt % tetraethylrhodamine as a fluorescent substance.

Spin-coating the obtained perovskite layer with a $^{63}$NiCl$_x$-copper oxide-ethyl acetate solution at a speed of 5000 rpm by using a spin coater, where the concentration of the copper oxide is 0.1 mol/L. Heating the perovskite layer at 100° C. for 60 minutes to obtain a 30-nm thick radioactive second charge transport layer containing 5 wt % $^{63}$NiCl$_x$, where the second charge transport layer is a hole transport layer.

Making a specimen of the resultant product on which the first electrode, the first charge transport layer, the perovskite layer, and the second charge transport layer have been formed, putting the specimen into a vacuum coater, and co-evaporating and depositing $^{63}$NiCl$_x$ and Ag on the surface of the obtained second charge transport layer under a vacuum condition of 5×1$^{-4}$ Pa, where the ratio of the evaporation speed between $^{63}$NiCl$_x$ and Ag is 0.1:1, so as to obtain a radioactive Ag electrode that is 80 nm thick. Using this electrode as a second electrode.

In this way, the perovskite betavoltaic-photovoltaic battery in Embodiment 1 is obtained.

Embodiments 2 to 7

Making the perovskite betavoltaic-photovoltaic battery in Embodiments 2 to 7 by performing the same operations as in Embodiment 1 except that the mass percent of tetraethylrhodamine in the formed perovskite layer is set to be 1 wt %, 10 wt %, 13 wt %, 15 wt %, 25 wt %, and 35 wt %.

Embodiment 8

Magnetron-sputtering a 5 wt % Hg$^{35}$S-FTO target material of Hg$^{35}$S on a white glass substrate of 2.0 cm×2.0 cm in size. The magnetron sputtering is performed by using a reciprocating vacuum coater, the sputtering power is 1000 W, the ratio of argon to oxygen is 1:1, the pressure is 0.25 Pa, and the sputter deposition thickness is 550 nm. In this way, a radioactive FTO conductive glass electrode is obtained.

Washing the surface of the obtained radioactive FTO conductive glass twice with acetone and isopropanol separately. Immersing the FTO conductive glass in deionized water, and sonicating the glass for 10 minutes. Drying the glass in a blast air oven, placing the glass into a glovebox (in a N$_2$ atmosphere), and using the glass as a first electrode.

Adding Hg$^{35}$S in a ZnO nanocolloid aqueous solution to obtain a precursor solution, in which the mass percent of ZnO is 3 wt %, and the mass percent of Hg$^{35}$S is 5 wt %. Spin-coating the FTO layer of the first electrode with the precursor solution at a speed of 5000 rpm by using a spin coater. Subsequently, heating the FTO layer of the first electrode at 150° C. for 15 minutes on a constant-temperature hotplate to obtain a radioactive first charge transport layer that is 30 nm thick, where the first charge transport layer is an electron transport layer.

Spin-coating the obtained first charge transport layer with a fluorescein isothiocyanate-FAPbI$_3$-DMF solution at a speed of 4500 rpm by using a spin coater, in which the concentration of FAPbI$_3$ is 1.5 mol/L. Subsequently, moving the first charge transport layer onto the constant-temperature hotplate, heating the first charge transport layer at 100° C. for 30 minutes, and then cooling the first charge transport layer down to a room temperature to form a 500-nm thick perovskite layer containing 13 wt % fluorescein isothiocyanate as a fluorescent substance.

Spin-coating the obtained perovskite layer with a Hg$^{35}$S-cuprous oxide-ethyl acetate solution at a speed of 5000 rpm by using a spin coater, where the concentration of the cuprous oxide is 0.1 mol/L. Heating the perovskite layer at 100° C. for 60 minutes to obtain a 30-nm thick radioactive second charge transport layer containing 5 wt % Hg$^{35}$S, where the second charge transport layer is a hole transport layer.

Making a specimen of the resultant product on which the first electrode, the first charge transport layer, the perovskite layer, and the second charge transport layer have been formed, putting the specimen into a vacuum coater, and co-evaporating and depositing Hg$^{35}$S and Ag on the surface of the obtained second charge transport layer under a vacuum condition of 5×10$^{-4}$ Pa, where the ratio of the evaporation speed between Hg$^{35}$S and Ag is 0.1:1, so as to obtain a radioactive Ag electrode that is 80 nm thick. Using this electrode as a second electrode.

In this way, the perovskite betavoltaic-photovoltaic battery in Embodiment 8 is obtained.

Comparative Embodiment 1

Forming a perovskite layer containing no fluorescent substance by using a FAPbI$_3$-DMF solution in which the concentration of FAPbI$_3$ is 1.5 mol/L. Performing other steps in the same way as in Embodiment 1 to form the perovskite betavoltaic-photovoltaic battery in Comparative Embodiment 1.

Comparative Embodiment 2

Magnetron-sputtering an FTO target material on a white glass substrate of 2.0 cm×2.0 cm in size. The magnetron sputtering is performed by using a reciprocating vacuum coater, the sputtering power is 1000 W, the ratio of argon to oxygen is 1:1, the pressure is 0.25 Pa, and the sputter deposition thickness is 550 nm. In this way, a non-radioactive FTO conductive glass electrode is obtained. Washing the surface of the obtained FTO conductive glass twice with acetone and isopropanol separately. Immersing the FTO conductive glass in deionized water, and sonicating the glass for 10 minutes. Drying the glass in a blast air oven, placing the glass into a glovebox (in a $N_2$ atmosphere), and using the glass as a first electrode.

Spin-coating the first electrode with a 3 wt % $SnO_2$ nanocolloid aqueous solution at a speed of 5000 rpm by using a spin coater. Subsequently, heating the first electrode at 150° C. for 15 minutes on a constant-temperature hotplate to obtain a non-radioactive first charge transport layer that is 30 nm thick.

The fluorescent substance-containing perovskite layer is prepared in the same way as in Embodiment 1 except that the mass percent of tetraethylrhodamine in the formed perovskite layer is set to 13 wt %.

Spin-coating the obtained perovskite layer with a 0.1 mol/L copper oxide-ethyl acetate solution at a speed of 5000 rpm by using a spin coater. Heating the perovskite layer at 100° C. for 60 minutes to obtain a 30-nm thick non-radioactive second charge transport layer, where the second charge transport layer is a hole transport layer.

Making a specimen of the resultant product on which the first electrode, the first charge transport layer, the perovskite layer, and the second charge transport layer have been formed, putting the specimen into a vacuum coater, and evaporating and depositing an 80-nm thick Ag electrode on the surface of the obtained second charge transport layer under a vacuum condition of $5 \times 10^{-4}$ Pa. Using this electrode as a second electrode.

In this way, the perovskite betavoltaic-photovoltaic battery in Comparative Embodiment 2 is formed.

Comparative Embodiment 3

With respect to the betavoltaic-photovoltaic battery in Comparative Embodiment 3, the formation of the first electrode, the first charge transport layer, the second charge transport layer, and the second electrode is the same as that of Comparative Embodiment 2, and the formation of the perovskite layer is the same as that of Comparative Embodiment 1. To be specific, the betavoltaic-photovoltaic battery of Comparative Embodiment 3 includes the non-radioactive first electrode, the non-radioactive first charge transport layer, the perovskite layer containing no fluorescent substance, the non-radioactive second charge transport layer, and the non-radioactive second electrode in sequence.

Performance test of the perovskite betavoltaic-photovoltaic battery

A performance test is performed on the perovskite betavoltaic-photovoltaic batteries of Embodiments 2 to 8 and Comparative Embodiments 1 to 3.

Specifically, the energy conversion efficiency of the perovskite betavoltaic-photovoltaic battery in each Embodiment and Comparative Embodiment is measured. In an atmospheric environment, an AM1.5 G standard light source is used as a sunlight simulated light source. A volt-ampere characteristic curve of the battery is plotted by measuring with a (Keithley 2440) 4-channel system sourcemeter under the illumination of a light source, so as to obtain an open-circuit voltage $V_{oc}$, a short-circuit current density $J_{sc}$, and a fill factor (FF) of the battery. Based on this, an energy conversion efficiency Eff (Efficiency) of the battery is calculated.

The energy conversion efficiency is calculated according to:

$$Eff = P_{out}/P_{opt} = V_{oc} \times J_{sc} \times (V_{mpp} \times J_{mpp})/(V_{oc} \times J_{sc}) = V_{oc} \times J_{sc} \times FF.$$

In the formula above, $P_{out}$, $P_{opt}$, $V_{mpp}$, and $J_{mpp}$ are an operating output power, an incident light power, a voltage at a maximum power point, and a current at a maximum power point of the battery, respectively.

By setting the energy conversion efficiency of the perovskite betavoltaic-photovoltaic battery in Comparative Embodiment 3 to 1, the increase rate of the energy conversion efficiency of the perovskite betavoltaic-photovoltaic battery in each embodiment and comparative embodiment is calculated in contrast to the energy conversion efficiency of the perovskite betavoltaic-photovoltaic battery in Comparative Embodiment 3.

In addition, the steady-state operating temperature of the perovskite betavoltaic-photovoltaic battery in each embodiment and comparative embodiment is determined. After the battery works steadily for at least 15 minutes in an atmospheric environment, the steady-state operating temperature of the battery is measured with an infrared thermometer.

The test results are recorded in Table 1.

TABLE 1

|  | Mass percent of fluorescent substance (wt %) | Open circuit voltage (V) | Short-circuit current density (mA/cm$^2$) | Fill factor (%) | Energy conversion efficiency (%) | Increase rate of spectral utilization efficiency (%) | Steady-state operating temperature of battery (° C.) |
|---|---|---|---|---|---|---|---|
| Embodiment 1 | 5 | 1.15 | 23.8 | 76.8 | 21.0 | 7.7 | 42.0 |
| Embodiment 2 | 1 | 1.14 | 23.7 | 76.5 | 20.7 | 6.2 | 42.5 |
| Embodiment 3 | 10 | 1.16 | 24.0 | 76.5 | 21.3 | 9.2 | 41.4 |
| Embodiment 4 | 13 | 1.16 | 24.2 | 77.3 | 21.7 | 11.3 | 41.2 |
| Embodiment 5 | 15 | 1.16 | 24.1 | 76.5 | 21.4 | 9.7 | 41.3 |
| Embodiment 6 | 25 | 1.14 | 23.6 | 76.9 | 20.7 | 6.2 | 41.5 |
| Embodiment 7 | 35 | 1.14 | 23.6 | 76.6 | 20.6 | 5.6 | 41.8 |
| Embodiment 8 | 13 | 1.13 | 23.5 | 76.5 | 20.5 | 5.1 | 41.6 |

TABLE 1-continued

|  | Mass percent of fluorescent substance (wt %) | Open circuit voltage (V) | Short-circuit current density (mA/cm$^2$) | Fill factor (%) | Energy conversion efficiency (%) | Increase rate of spectral utilization efficiency (%) | Steady-state operating temperature of battery (°C.) |
|---|---|---|---|---|---|---|---|
| Comparative Embodiment 1 | 0 | 1.13 | 23.4 | 75.6 | 20.0 | 2.6 | 45.1 |
| Comparative Embodiment 2 | 13 | 1.14 | 23.5 | 75.8 | 20.3 | 4.1 | 41.8 |
| Comparative Embodiment 3 | 0 | 1.10 | 23.4 | 75.8 | 19.5 | 0 | 44.8 |

In contrast to Comparative Embodiments 1 to 3, the structure in Embodiments 1 to 8 above includes the radioactive first electrode, the radioactive first charge transport layer, the fluorescent substance-containing perovskite layer, the radioactive second charge transport layer, and the radioactive second electrode, and therefore, can improve the energy conversion efficiency and the spectral utilization efficiency, and at the same time, maintain a relatively good steady-state operating temperature of the battery.

It is hereby noted that this application is not limited to the foregoing embodiments. The foregoing embodiments are merely examples. Any and all embodiments with substantively the same composition or exerting the same effects as the technical ideas hereof without departing from the scope of the technical solutions of this application still fall within the technical scope of this application. In addition, all kinds of variations of the embodiments conceivable by a person skilled in the art and any other embodiments derived by combining some constituents of the embodiments hereof without departing from the subject-matter of this application still fall within the scope of this application.

What is claimed is:

1. A perovskite betavoltaic-photovoltaic battery, characterized in that the battery comprises a first electrode, a first charge transport layer, a perovskite layer, a second charge transport layer, and a second electrode in sequence, wherein the first electrode is a transparent electrode;

the first charge transport layer is an electron transport layer and the second charge transport layer is a hole transport layer, or, the first charge transport layer is a hole transport layer and the second charge transport layer is an electron transport layer;

the perovskite layer is doped with a fluorescent substance;

at least one of the first electrode, the first charge transport layer, the second charge transport layer, or the second electrode is radioactive; and when the first electrode and/or the second electrode is radioactive, the first electrode and/or the second electrode is an irradiated electrode formed by compounding a radioactive source and a conductor material; and, when the first charge transport layer and/or the second charge transport layer is radioactive, the first charge transport layer and/or the second charge transport layer is an irradiated semiconductor formed by compounding a radioactive source and a semiconductor material.

2. The perovskite betavoltaic-photovoltaic battery according to claim 1, characterized in that a mass percent of the fluorescent substance contained in the perovskite layer is 1 wt % to 30 wt %, and optionally 10 wt % to 15 wt %, of a total mass of the perovskite layer.

3. The perovskite betavoltaic-photovoltaic battery according to claim 1, characterized in that the fluorescent substance in the perovskite layer is at least one selected from riboflavin, fluorescein isothiocyanate, tetraethyl rhodamine, tetramethyl isothiocyanate rhodamine, phycoerythrin, an iridium complex, a rare earth element complex, a polyfluorene compound, a coumarin compound, a naphthalimide compound, a triacene compound or a higher-acene compound, a rhodamine compound, a fluorescein compound, a fluoroborodipyrrole compound, a resorufin compound, a pyrazoline compound, a triphenylamine compound, a carbazole compound, green fluorescent protein, a bimane fluorescent compound, a perovskite luminescent nanomaterial, a thermally activated delayed fluorescence (TADF) compound, a chelate of trivalent rare earth lanthanides, and any derivative or copolymer thereof, and is optionally tetraethylrhodamine or a chelate of trivalent rare earth lanthanides, wherein the chelate of trivalent rare earth lanthanides is optionally LaF3:Eu3+.

4. The perovskite betavoltaic-photovoltaic battery according to claim 1, characterized in that perovskite in the perovskite layer satisfies a chemical formula ABX$_3$, wherein A is at least one selected from methylamine cation MA$^+$, formamidinium cation FA$^+$, and cesium cation Cs$^+$; B is at least one selected from lead cation Pb$^{2+}$ and tin cation Sn$^{2+}$; and X is at least one selected from halogen anion and COO$^-$.

5. The perovskite betavoltaic-photovoltaic battery according to claim 1, characterized in that the radioactive source is at least one selected from an α-type radioactive source, a β-type radioactive source, an X-ray radioactive source, and a γ-ray radioactive source.

6. The perovskite betavoltaic-photovoltaic battery according to claim 5, characterized in that the α-type radioactive source is at least one selected from $^{210}$Po or a compound thereof, $^{228}$Th or a compound thereof, $^{235}$U or a compound thereof, $^{238}$Pu or a compound thereof, $^{238}$PuO$_2$ microspheres, $^{241}$Am or a compound thereof, $^{242}$Cm or a compound thereof, and $^{244}$Cm or a compound thereof; and the β-type radioactive source is at least one selected from (C$_4$H$_3$$^3$H$_5$-)$_n$, $^3$H$_2$, Ti$^3$H$_4$, $^{14}$C or a compound thereof, $^{35}$S or a compound thereof, $^{63}$Ni or a compound thereof, $^{90}$Sr or a compound thereof, $^{90}$Sr/$^{90}$Y, $^{99}$Tc or a compound thereof, $^{106}$Ru or a compound thereof, $^{137}$Cs or a compound thereof, $^{144}$Ce or a compound thereof, $^{147}$Pm or a compound thereof, $^{151}$Sm or a compound thereof, and $^{226}$Ra or a compound thereof.

7. The perovskite betavoltaic-photovoltaic battery according to claim 1, characterized in that
the radioactive source is at least one selected from Ti$^3$H$_4$, $^{63}$Ni or a compound thereof, and $^{90}$Sr/$^{90}$Y.

8. The perovskite betavoltaic-photovoltaic battery according to claim 1, characterized in that
a mass percent of the radioactive source in the irradiated electrode and/or the irradiated semiconductor is 90 wt % or less, and optionally 5 wt % to 30 wt %.

9. The perovskite betavoltaic-photovoltaic battery according to claim 1, characterized in that
the semiconductor material of the first charge transport layer and the second charge transport layer is at least one of the following materials or a derivative thereof: an imide compound; a quinone compound; fullerene or a derivative thereof; 2,2',7,7'-tetrakis(N,N-p-methoxyanilino)-9,9'-spirobifluorene; methoxytriphenylamine-fluoroformamidine; poly(3,4-ethylenedioxythiophene): polystyrene sulfonic acid; poly-3-hexylthiophene; triptycene-cored triphenylamine; 3,4-ethylenedioxythiophene-methoxytriphenylamine; N-(4-aniline) carbazole-spirobifluorene; polythiophene; metal oxide of a metal element selected from Mg, Ni, Cd, Zn, In, Pb, Mo, W, Sb, Bi, Cu, Hg, Ti, Ag, Mn, Fe, V, Sn, Zr, Sr, Ga, and Cr; silicon oxide; strontium titanium oxide; calcium titanium oxide; lithium fluoride; calcium fluoride; and cuprous thiocyanate.

10. The perovskite betavoltaic-photovoltaic battery according to claim 1, characterized in that
the conductor material of the first electrode and the second electrode is an organic conductive material, an inorganic conductive material, or a conductive material compounded of an organic conductive material and an inorganic conductive material;
the organic conductive material is at least one selected from: a polymer of (3,4-ethylenedioxythiophene monomer); polythiophene; polyacetylene; polypyrrole; polyphenylene; polyphenylacetylene; polyaniline; epoxy resin; phenol-formaldehyde resin, and polypropylene; and
the inorganic conductive material is at least one selected from a transparent conductive oxide, a metal, and a carbon derivative.

11. The perovskite betavoltaic-photovoltaic battery according to claim 1, characterized in that
a thickness of the first electrode is 50 nm to 1000 nm; and/or
a thickness of the first charge transport layer is 10 nm to 1000 nm; and/or
a thickness of the perovskite layer is 50 nm to 2000 nm; and/or
a thickness of the second charge transport layer is 10 nm to 1000 nm; and/or
a thickness of the second electrode is 10 nm to 500 nm.

12. A method for manufacturing a perovskite betavoltaic-photovoltaic battery, wherein the perovskite betavoltaic-photovoltaic battery comprises a first electrode, a first charge transport layer, a perovskite layer, a second charge transport layer, and a second electrode in sequence, and the manufacturing method comprises:
a step of forming the first charge transport layer on the first electrode;
a step of forming the perovskite layer on the first charge transport layer;
a step of forming the second charge transport layer on the perovskite layer; and
a step of forming the second electrode on the second charge transport layer, wherein
the first electrode is a transparent electrode;
the first charge transport layer is an electron transport layer and the second charge transport layer is a hole transport layer, or, the first charge transport layer is a hole transport layer and the second charge transport layer is an electron transport layer;
the perovskite layer is doped with a fluorescent substance;
at least one of the first electrode, the first charge transport layer, the second charge transport layer, or the second electrode is radioactive;
when the first electrode and/or the second electrode is radioactive, the first electrode and/or the second electrode is an irradiated electrode formed by compounding a radioactive source and a conductor material; and, when the first charge transport layer and/or the second charge transport layer is radioactive, the first charge transport layer and/or the second charge transport layer is an irradiated semiconductor formed by compounding a radioactive source and a semiconductor material;
when the first electrode and/or the second electrode is an irradiated electrode, the irradiated electrode is compounded of the radioactive source and the conductor material by at least one method selected from: a chemical bath deposition method, an electrochemical deposition method, a chemical vapor deposition method, a physical epitaxial growth method, a thermal co-evaporation method, an atomic layer deposition method, a magnetron sputtering method, a precursor solution spin-coating method, a precursor solution slot-die coating method, a precursor solution scrape coating method, and a mechanical pressing method; and
when the first charge transport layer and/or the second charge transport layer is an irradiated semiconductor, the irradiated semiconductor is compounded of the radioactive source and the semiconductor material by at least one method selected from: a chemical bath deposition method, an electrochemical deposition method, a chemical vapor deposition method, a physical epitaxial growth method, a thermal co-evaporation method, an atomic layer deposition method, a magnetron sputtering method, a precursor solution spin-coating method, a precursor solution slot-die coating method, a precursor solution scrape coating method, and a mechanical pressing method.

13. The manufacturing method according to claim 12, characterized in that
the irradiated electrode or the irradiated semiconductor is compounded by at least one of the thermal co-evaporation method, the magnetron sputtering method, or the precursor solution spin-coating method.

\* \* \* \* \*